April 9, 1968 W. WHITNEY 3,377,433

SWITCHING SYSTEM ARRANGEMENT FOR PROVIDING MULTIPLE SWITCHING NETWORK LINE APPEARANCES WITHOUT PREASSIGNMENT

Filed Dec. 2, 1964

14 Sheets-Sheet 1

INVENTOR
W. WHITNEY
BY
R. C. Winter
ATTORNEY

April 9, 1968 W. WHITNEY 3,377,433

SWITCHING SYSTEM ARRANGEMENT FOR PROVIDING MULTIPLE SWITCHING NETWORK LINE APPEARANCES WITHOUT PREASSIGNMENT

Filed Dec. 2, 1964 14 Sheets-Sheet

April 9, 1968 W. WHITNEY 3,377,433

SWITCHING SYSTEM ARRANGEMENT FOR PROVIDING MULTIPLE SWITCHING NETWORK LINE APPEARANCES WITHOUT PREASSIGNMENT

Filed Dec. 2, 1964

14 Sheets-Sheet 5

April 9, 1968 W. WHITNEY 3,377,433

SWITCHING SYSTEM ARRANGEMENT FOR PROVIDING MULTIPLE SWITCHING NETWORK LINE APPEARANCES WITHOUT PREASSIGNMENT

Filed Dec. 2, 1964

14 Sheets-Sheet 10

April 9, 1968 W. WHITNEY 3,377,433

SWITCHING SYSTEM ARRANGEMENT FOR PROVIDING MULTIPLE
SWITCHING NETWORK LINE APPEARANCES
WITHOUT PREASSIGNMENT

Filed Dec. 2, 1964 14 Sheets-Sheet 12

April 9, 1968 W. WHITNEY 3,377,433

SWITCHING SYSTEM ARRANGEMENT FOR PROVIDING MULTIPLE SWITCHING NETWORK LINE APPEARANCES WITHOUT PREASSIGNMENT

Filed Dec. 2, 1964 14 Sheets-Sheet 13

SWITCHING SYSTEM ARRANGEMENT FOR PROVIDING MULTIPLE SWITCHING NETWORK LINE APPEARANCES WITHOUT PREASSIGNMENT

Filed Dec. 2, 1964

United States Patent Office 3,377,433
Patented Apr. 9, 1968

3,377,433

SWITCHING SYSTEM ARRANGEMENT FOR PROVIDING MULTIPLE SWITCHING NETWORK LINE APPEARANCES WITHOUT PREASSIGNMENT

Wiley Whitney, Columbus, Ohio, assignor to Bell Telephone Laboratories, Incorporated, New York, N.Y., a corporation of New York Filed Dec. 2, 1964, Ser. No. 415,319
16 Claims. (Cl. 179—18)

ABSTRACT OF THE DISCLOSURE

The preassigned dual station line appearance requirement of the calls-waiting and add-on features is eliminated by providing a switching circuit having one output (trunk) appearance and two input (line) appearances in a switching network. Each special service station line is connected via the network output appearance of any available switching circuit, through the switching circuit, to the dual input appearances for the duration of each call. Upon the completion of the initial connection of a switching circuit, a memory records the association of the specific line and the specific switching circuit to provide a source of this information for subsequent use by the common control equipment in providing the associated special service features.

Figure 1:
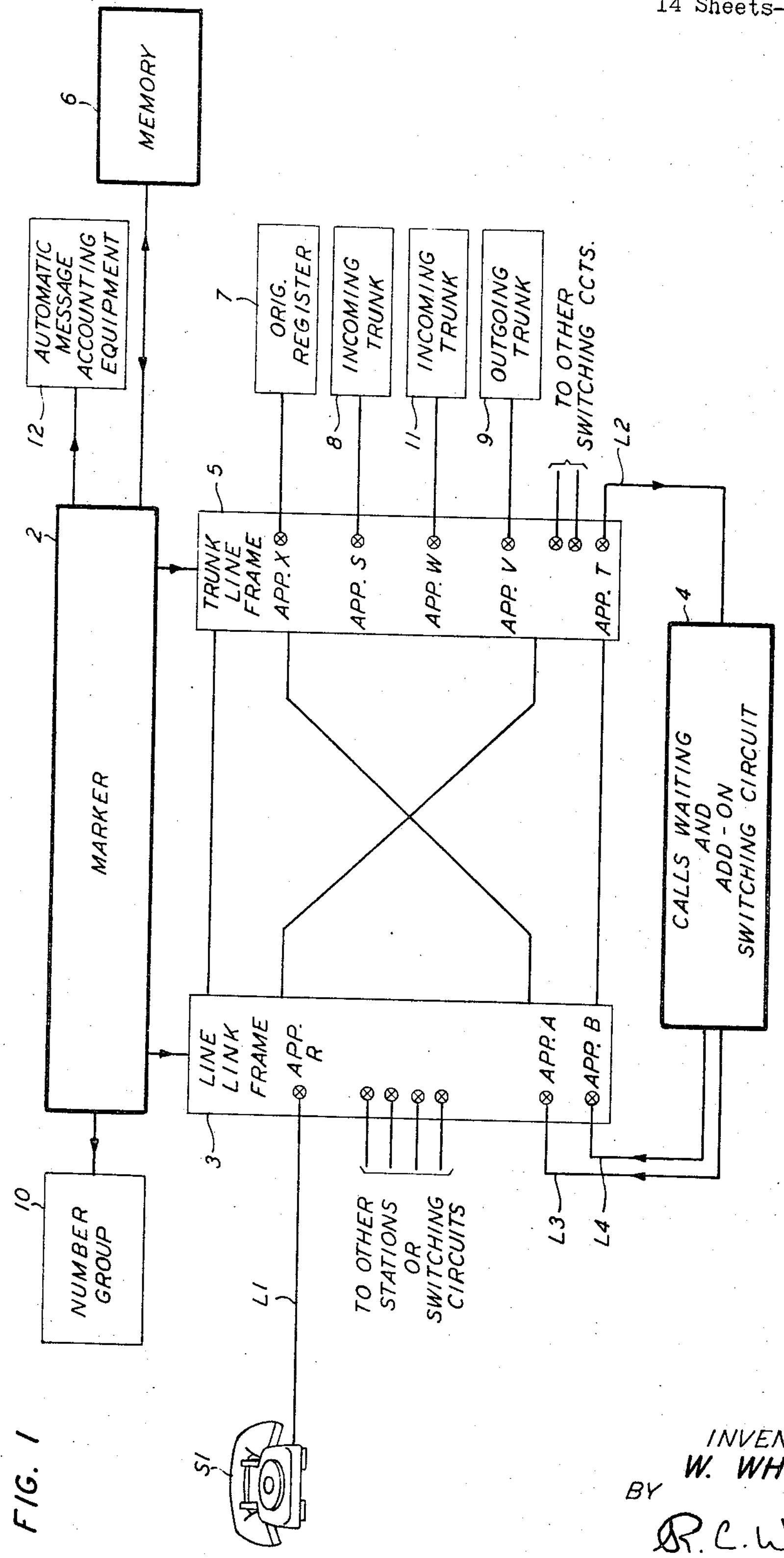

This invention relates generally to telephone switching systems, and particularly to switching network arrangements within such systems wherein special service line circuits require a plurality of network appearances in order to fulfill their special service function. More particularly, this invention pertains to switching network arrangements wherein each special service line circuit is enabled to operate without requiring the preassignment of more than one such network appearance.

Extensive development of telephone switching systems in recent years has made possible the provision of numerous special features which render telephone service more convenient and more flexible. For example, circuit arrangements have been provided to enable a special service subscriber currently engaged in a telephone conversation to be advised via an audible calls-waiting signal that another call has been directed to his line. Other special service lines have been provided with another feature called "add-on" wherein an additional called line may be added to an existing connection in conference fashion. It is obvious that the provision of these and other similar features inherently requires more than one line appearance per special service station in the associated switching network. In consequence, the ever increasing demand for these features, with the attendant assignment of an auxiliary line appearance per feature, places an economic burden upon central office facilities. This is particularly unsatisfactory in view of the fact that such features are often not exercised concurrently and in many cases, are exercised infrequently.

An arrangement set forth in application Ser. No. 317,930, filed Oct. 22, 1963 by M. E. Krom, now Patent 3,320,367, issued May 16, 1967, disclosed, among other features, a partial solution to the problem by combining the calls-waiting and add-on features in one switching circuit, thereby requiring only a single additional line appearance per special service station. Though such an arrangement is satisfactory in many instances, it is recognized that other equivalent features are not compatible and in fact, some are mutually exclusive. Thus the combining of such features may prove to be impractical. In addition thereto, although the Krom arrangement presents a significant improvement over the prior art, the requirement still remains for at least one additional preassigned line appearance per special service station. As the demand for these features continues to increase, it is evident that the need for a satisfactory arrangement which eliminates the requirement for the preassigned additional line appearance becomes of singular importance.

In view of the foregoing, an object of this invention is to provide a switching network arrangement which may be simply and economically implemented in existing systems so as to obviate the preassigned additional line appearance requirement of special service features.

A further object is to provide a network arrangement which obviates the preassigned additional line appearance requirement of special services without necessitating additional customer instruction and without detracting in any way from the service which the associated special service feature seeks to provide.

A still further object is to provide a network arrangement which obviates the preassigned additional line appearance requirement of special services without requiring significant circuit changes in the control circuitry associated with the special service feature.

These and other objects of the invention are attained in accordance with an exemplary embodiment wherein a plurality of stations are each provided with the special service features referred to as "call-waiting" and "add-on" as well known in the art and as described with particularity in the aforesaid copending application by M. E. Krom. In the instant embodiment, each such special service station is provided with a permanent input appearance in the central office switching network. A plurality of special service switching circuits is also provided, but in significantly lesser quantity than the aforesaid privileged stations. Each such switching circuit contains the necessary control and supervisory apparatus for providing the calls-waiting and add-on features, and is provided with an output appearance and two input appearances in the same switching network as the privileged stations.

A common control circuit associated with the switching network is arranged to recognize the special service status of the privileged stations and to insert a switching circuit serially in all connections involving such stations by completing a linkage connection between the station's permanent input appearance and the network output appearance of an available switching circuit. Upon so doing the control circuit is further arranged to record in a memory the association between the particular station and the particular switching circuit.

Thus, upon the off-hook condition of a special service station, the control circuit completes a connection from the permanent input appearance of the station via the switching network to the output appearance of an available switching circuit. The control circuit then records the association between the special service station and the switching circuit by recording their respective identities in a memory where it is thereafter available as required.

Upon the connection of the switching circuit to the special service station, the dual input appearances of the switching circuit, designated hereinafter as subsidiary input appearances, function as set forth in the above-referred to Krom application so as to provide the special service features for incoming and outgoing connections to the special service station. Accordingly, upon the completion of an outgoing connection from a first subsidiary appearance to a called line or trunk, the control circuit interrogates the memory using the subsidiary appearance designation so as to read out the special service station identity for charging purposes. This procedure is again repeated when an add-on connection is completed from the other subsidiary appearance.

When an incoming call is to be completed to an idle special service station, the control circuit is arranged to recognize the privileged status of the called line and to insert an available switching circuit serially in the connection. The association between the station and the switching circuit, as above described, is recorded in the memory for subsequent use. Thus, for example, a subsequent incoming connection to the called station is completed to the idle subsidiary appearance of the switching circuit associated with the special service station based upon information read out of the memory.

Upon abandonment of the connection by the privileged party, the associated information stored in the memory is erased and the switching circuit is released so as to be available to serve other special service stations in similar fashion as above set forth.

In accordance with one feature of my invention, a control circuit is arranged to recognize the privileged status of a calling line having a permanent appearance and to automatically connect the line through the network so as to provide the line with a selected group of subsidiary appearances.

In accordance with another feature of my invention, a control circuit is arranged to connect a special service line having a permanent input appearance through the network so as to provide the line with a group of subsidiary appearances and to thereafter record in a memory the association between the permanent appearance and the selected group of subsidiary appearances.

In accordance with another feature of my invention, a control circuit is arranged ot recognize the privileged status of a busy called line, to interrogate a memory so as to ascertain the identity of another line appearance temporarily associated with the privileged line, and to thereupon complete a connection to the other line appearance.

In accordance with another feature of my invention, a control circuit is arranged to interrogate a memory to ascertain the identity of a permanent line appearance in response to the origination of a called connection from another line appearance temporarily associated therewith.

Figure 12:
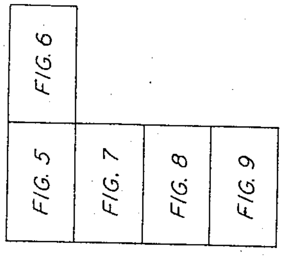
Figure 9:
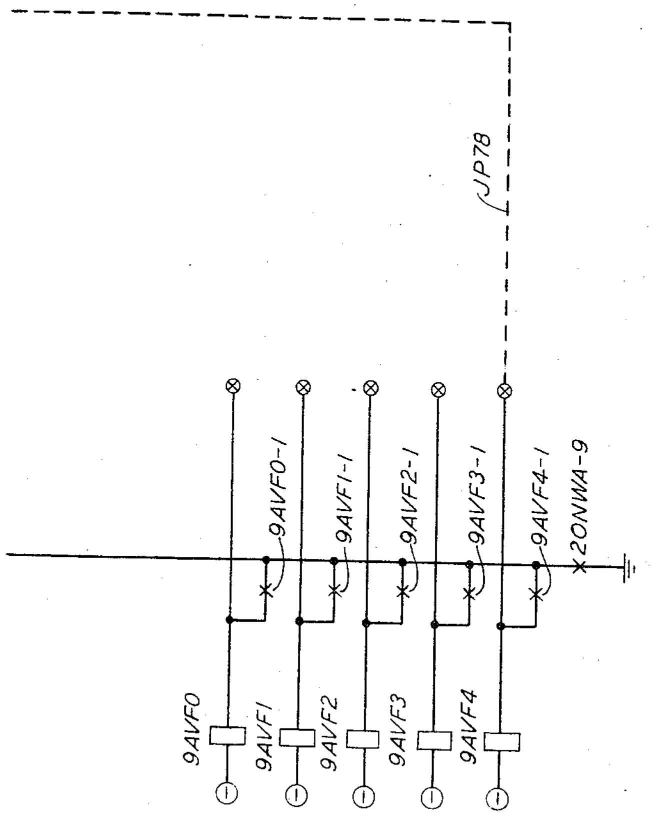
Figure 13:
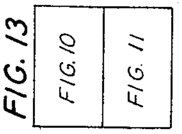
Figure 11:
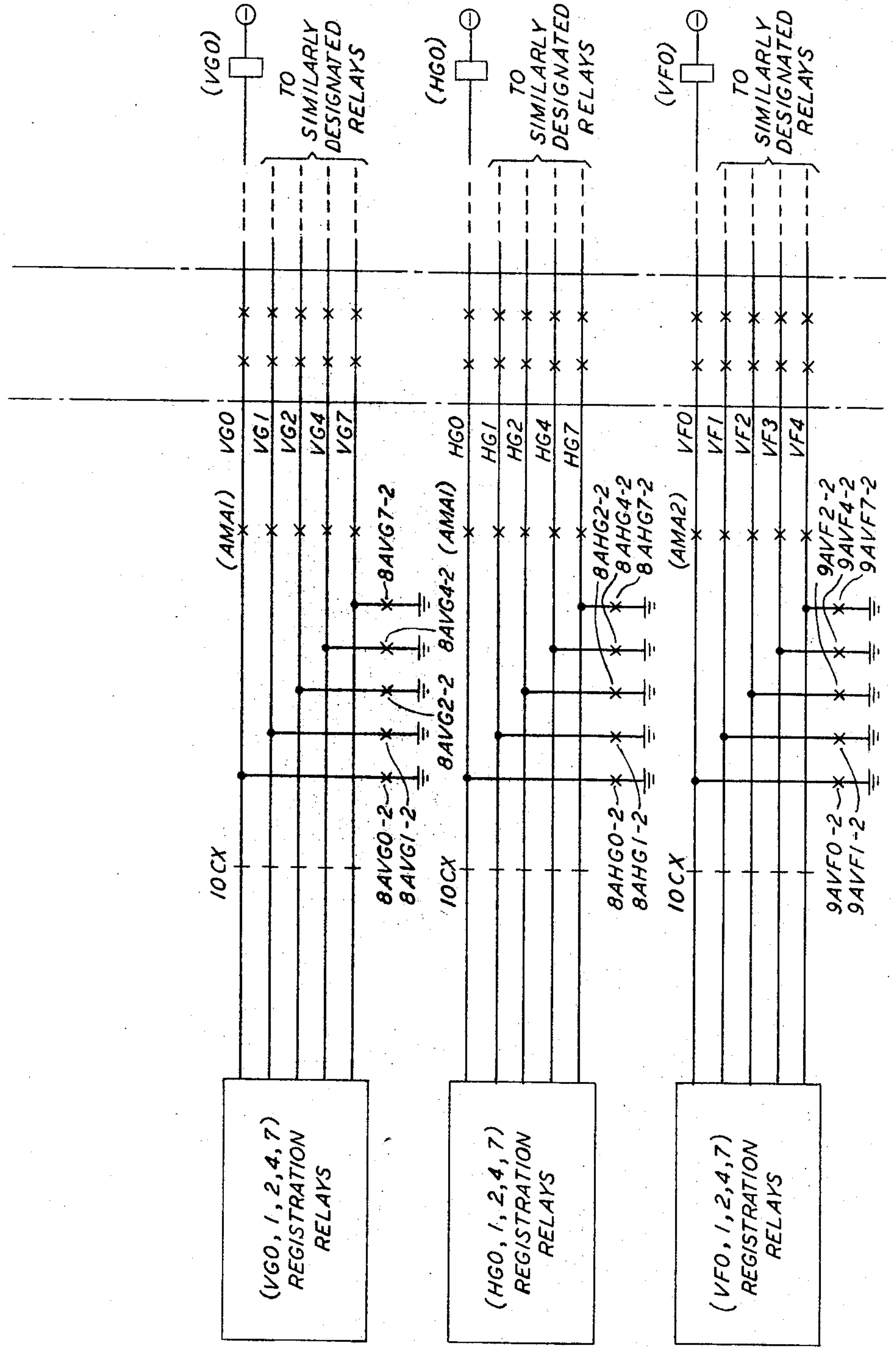

The foregoing objects and features, as well as others, of this invention will be more apparent from a consideration of the subsequent description and drawing, in which:

FIG. 1 is essentially a block diagram showing the interrelationship of the exemplary embodiment;

FIGS. 2 through 11 and 14 through 16 show in greater detail some of the components of the exemplary embodiment; and FIGS. 12 and 13 show the manner in which the various figures should be arranged.

It will be noted that FIGS. 2 through 11 and 14 through 16 employ a type of notation referred to as "detached contact" in which an X represents a normally open contact of a relay, and a bar, shown intersecting a conductor at right angles, represents a normally closed contact of a relay; "normally" referring to the unoperated condition of the relay. The principles of this type of notation are described in an article entitled, "An Improved Detached-Contact-Type Schematic Circuit Drawing," by F. T. Meyer in the September 1955 publication of the American Institute of Electrical Engineers Transactions, Communications and Electronics, vol. 74, pp. 505–513.

The present invention may be advantageously incorporated in an automatic telephone system wherein common control circuits are employed to control the establishment of calls through a switching network. One such system is disclosed in the A. J. Busch Patent No. 2,585,904, issued Feb. 19, 1952. It is to be understood, however, that the present invention is not limited to use in a telephone system of this type but may be utilized in other types of switching systems.

The invention is described herein as being embodied in a telephone system of the type disclosed in the cited Busch patent which is hereby made a part of this specification as though contained in detail herein. The invention is particularly concerned with apparatus in marker circuit 2, memory circuit 6, and switching circuit 4, which are represented by the blocks shown with heavy lines in FIG. 1. The other equipment units in the Busch system are neither shown nor described in detail herein except where necessary for a complete understanding of the invention. The cited Busch patent may be consulted for a complete understanding of the construction and operation of components not covered in detail herein.

For purposes of illustration, it is intended that the apparatus of line link frame 3, trunk link frame 5, originating register 7, incoming trunks 8 and 11, number group 10, automatic message accounting equipment 12 and outgoing trunk 9 be similar to the corresponding apparatus disclosed in the Busch patent. It is also intended that the apparatus in switching circuit 4 be similar to the corresponding apparatus disclosed in the above-recited copending application of M. E. Krom.

The interrelationship and function of the equipment units of the exemplary embodiment will now be described with reference to FIG. 1 wherein the interconnection between circuit blocks has been designated by arrows to indicate the direction of circuit action.

(1) GENERAL DESCRIPTION

A station S1 is connected via a line L1 to appearance R on line link frame 3. The input side of switching circuit 4 is connected via line L2 to output appearance T on trunk link frame 5. The dual output side of switching circuit 4 is connected via lines L3 and L4 to subsidiary input appearances A and B, respectively, on line link frame 3. It is thus apparent at this point that station S1, which we shall assume to be a special service station in its inactive state, is connected into the switching network via line link frame 3 in the same fashion as other stations (not shown) as set forth in detail in the cited Busch patent.

Deviating momentarily, switching circuit 4, when inserted serially between a special service station and a switching network, provides the necessary control apparatus for the calls-waiting and add-on features as described in detail in the aforecited Krom application which is hereby made a part of this specification as though contained in detail herein.

Proceeding now with the description, upon an off-hook condition of station S1 in a bid for the well-known dial tone connection, marker circuit 2 is associated with line link frame 3 as set forth in detail in the Busch patent. At this time, the marker recognizes the privileged status of station S1 and thereupon proceeds to establish a linkage connection from station S1 to an available switching circuit. Assuming that switching circuit 4 is idle at this time, a connection is thereupon established by marker circuit 2 between the permanent line appearance R on line link frame 3 and the switching circuit output appearance T on trunk link frame 5. This connection is established in identical fashion to that described for the selection and connection of an originating register as set forth in the A. J. Busch patent.

Upon the completion of this connection, marker 2 seizes memory circuit 6 and records therein the identity of the special service station and the identity of switching circuit 4 in terms of their respective equipment locations on line link frame 3. The marker 2 thereupon releases. It will be recognized from that which is contained in detail hereinafter that the marker 2 could be retained at this point to complete a dial tone connection through to the special service station via one of the selected switching circuit line link appearances. However, for purposes of illustration, marker 2 releases at this time. As set forth in detail in the above-cited Krom application, the connection of a continuous customer loop (as manifested herein by line L1) through to the input of switching circuit 4 causes the enabling of the switching circuit so as to bid for a dial tone connection via subsidiary appearance A on line link frame 3. Accordingly, a dial tone connection is established from appearance A to originating register 7 on trunk link frame 5 exactly as set forth in the Busch patent.

We shall assume that upon the reception of dial tone at station S1 the customer dials an outgoing call which requires the use of outgoing trunk 9. As set forth in detail in the Busch patent, upon being informed of the called line designation by the register 7, the marker 2 establishes a connection from appearance A on line link frame 3 to appearance V of outgoing trunk 9 on trunk link frame 5. Upon completing this connection, the marker recognizes from the class of service assigned to appearance A that the call is associated with a station designated by a different line appearance than that manifested by appearance A. Marker circuit 2 thereupon interrogates memory 6 using the equipment location information of appearance A, so as to read out the equipment location of appearance R which was recorded there previously as described above. The marker then forwards the equipment location information of appearance R to the charging equipment so as to cause the appropriate charge information to be billed to appearance R which is permanently associated with station S1.

Since station S1 is provided with the add-on feature, the subsequent exercise of this feature by the establishment of another connection from appearance B as set forth in the aforesaid Krom application, results in the marker following the same circuit procedure as immediately above described to thereby cause the recording of another charge against the permanent line appearance assignment of station S1.

Upon the completion of calls from station S1 to respective called parties via appearance A and appearance B of switching circuit 4, station S1 returns to an inactive state. Accordingly, as will be more apparent hereinafter, switching circuit 4 is released from the connection thereby rendering switching circuit 4 available for use by other special service stations. As will also be more apparent hereinafter, the release of switching circuit 4 causes the erasure of the associated information previously stored in memory 6 in connection with the most recently completed call.

We shall assume at this point that incoming trunk circuit 8 is activated by an incoming call which is directed to currently inactive station S1. As set forth in detail in the Busch patent, when the marker 2 receives the called line information, it interrogates number group circuit 10 so as to determine the line equipment information and ringing combination of the called party. In the instant case, upon so doing, the marker is arranged to recognize the privileged status of the called station from its preassigned ringing combination. To impart this information to the marker the preassignment of a specified ringing combination may be utilized, as herein set forth. However, it will be obvious from that which is contained hereinafter that numerous other techniques may be employed. For example, an additional translation indication may be returned by the number group in the manner set forth in application Serial No. 240,558 filed Nov. 28, 1962 by T. V. Burns et al., now Patent 3,264,415, issued Aug. 2, 1966.

Proceeding now with the description, in view of the special service status of station S1, the marker 2 recognizes that a switching circuit such as 4 will have been inserted priorly in a connection to station S1 if that station is currently active, or that if the station is not currently active that a switching circuit should be inserted serially in the completion of the current connection.

Therefore, the marker interrogates memory 6 at this time, using the special service station line equipment information received from the number group. Since we have assumed that station S1 is inactive at this time, there is no switching circuit currently associated therewith. The failure of the memory to indicate an associated switching circuit enables the marker 2 to complete a connection from appearance R of station S1 on line link frame 3 to appearance T of an available switching circuit such as switching circuit 4 on trunk link frame 5 as hereinbefore described.

Marker circuit 2 thereupon informs memory circuit 6 of the respective identities of station S1 and switching circuit 4 and thus of the fact of their current association in the instant connection. As a result of the storage of this information the marker 2 is informed by memory circuit 6 of the line equipment location information of the switching circuit 4 appearance A. The marker 2 then completes a connection from appearance A on line link frame 3 to appearance S of incoming trunk 8 on trunk link frame 5. Upon the completion of this connection, ringing takes place in the well-known fashion as described in detail in the copending Krom application and we shall assume that station S1 answers the call.

As also set forth in detail in the copending Krom application, the special service station S1 may, at this time, add on a called line to the existing connection via appearance B. If this connection were to occur at this time, it would proceed as hereinbefore described.

However, in the event another incoming call should arrive at this time via incoming trunk 11 for example, the marker 2 would again recognize the privileged status of called station S1 from the number group translation indication as above set forth. Upon interrogating the memory 6 for this subsequent incoming call, the marker 2 receives the appearance B equipment location information of switching circuit 4. Accordingly, a linkage connection is completed from incoming trunk 11 appearance W to appearance B. As set forth in detail in the copending Krom application, the completion of an incoming connection to appearance B enables the call-waiting tone feature of the special service switching circuit and the call proceeds as therein described.

Upon the abandonment of the connections to appearance A and appearance B, or upon abandonment of the connection at station S1, switching circuit 4 is released. The release of switching circuit 4 causes the erasure of the information priorly stored in memory 6 in connection with this most recently completed association of special service line and special service switching circuit. Switching circuit 4 and the network appearances associated therewith are then rendered available to serve other special service lines as above set forth.

(2) DETAILED DESCRIPTION

(2.01) *Introduction*

To facilitate the description of the embodiment, the designations of certain apparatus shown in the figures have been enclosed in parentheses to indicate that the control circuitry for such apparatus is shown and described in detail in the aforecited A. J. Busch patent and Krom application.

(2.02) *Originating connection from station S1*

Figure 2:
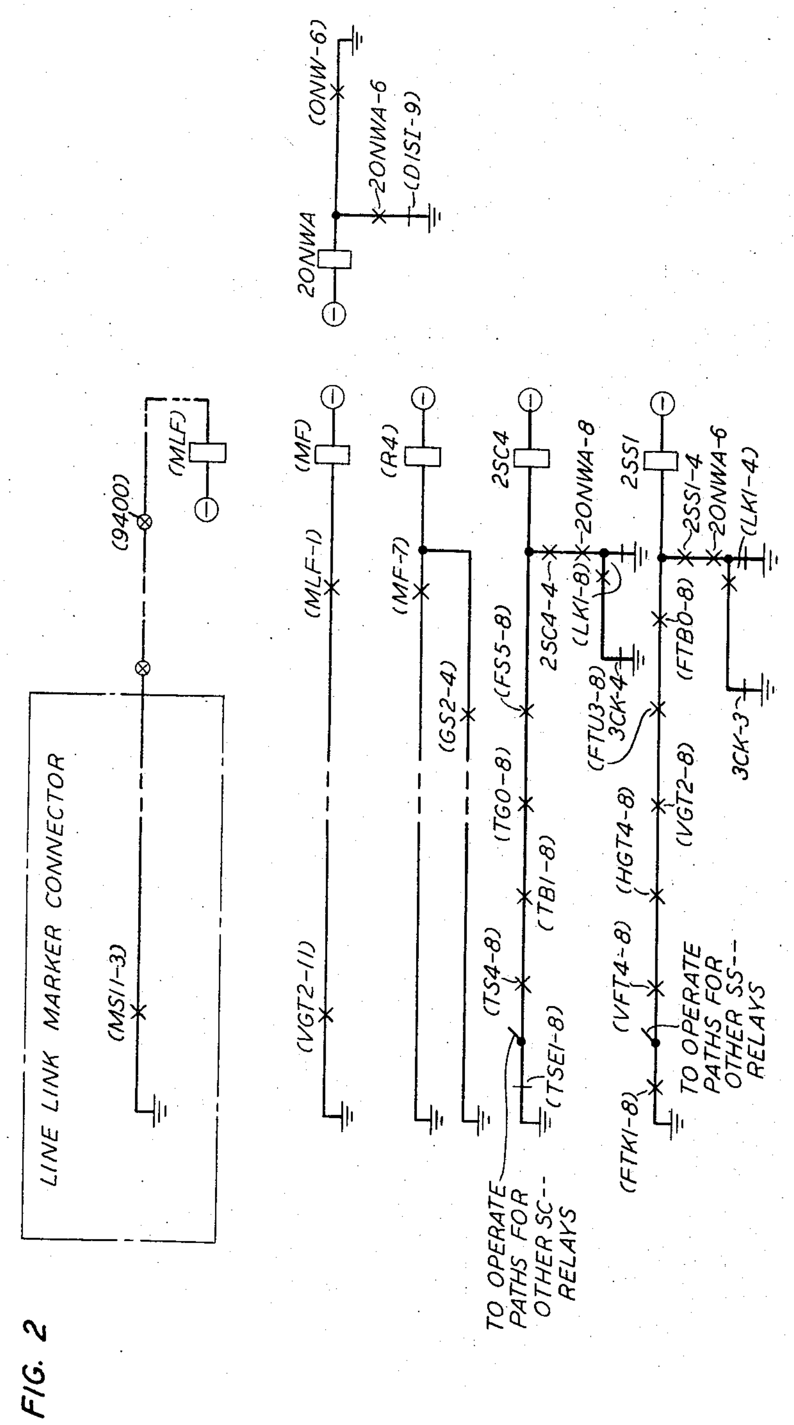

In the following, station S1 is changed from the on-hook to the enabled off-hook condition prior to dialing a call in the well-known manner. Referring now to FIG. 2, as set forth in the Busch patent beginning at column 9, line 60, the cross connection to operate raly (MLF) is designed for the situation where subscribers requiring different type originating registers are terminated on the same line link frame. In the instant arrangement this feature is employed to indicate to the marker that the line link frame contains special service stations requiring the serial insertion of a switching circuit in all connections, in addition to conventional lines not so privileged. Accordingly, the enabling of relay (MLF) in conjunction with the subsequent enabling of make contact (VGT2–11) causes the operation of relay (MF) so as to operate route relay (R4) which is arranged, as set forth in the Busch patent, to cause the marker to establish a connection to an available switching circuit appearing on a trunk link frame.

The various switching circuits are distributed so as to appear on predetermined trunk link frames in similar fashion to that described for originating registers in the Busch patent. At this point, marker circuit 2 proceeds to select a switching circuit in essentially the same manner as though an originating register were being connected at this time as set forth in the Busch patent. We shall assume that the marker tests reveal that switching circuit 4 on trunk link frame 5 is currently idle. The marker thereupon operates the appropriate control relays for seizing trunk link frame 5 which as set forth beginning at column 22, line 64 in the Busch patent, results in the enabling of trunk link frame selection relay (FS5). We shall assume, for purpose of illustration, that switching circuit 4 is uniquely selected on that frame as set forth in the Busch patent beginning at column 25, line 24, by the operation of relays (TS4), (TB1) and (TG0).

As further described in detail in the Busch patent, the release of relay (TSE1) marks the successful selection of a circuit appearing on a trunk link frame. In the instant embodiment, the released condition of break contact (TSE1–8) is advantageously utilized to complete the operate path of relay 2SC4 by extending ground through enabled make contacts (TS4–8), (TB1–8) and (TG0–8) which uniquely identify the switching circuit, and through (FS5–8) which uniquely identifies the trunk link frame, and thence through the winding of relay 2SC4, through to negative battery. Relay 2SC4 locks operated through enabled make contact 2SC4–4, enabled make contact 20NWA–8, to positive ground on released break contact (LK1–8). The operation of relay 2SC4 records the specific switching circuit selected by marker circuit 2 at this time.

As discussed in detail in the Busch patent, a particular subscribed line appearance is identified by its line link frame location, vertical group location, horizontal group location and vertical file location. In the instant embodiment, this information is employed to operate relay 2SS1 by an obvious circuit extending through identification relays which record the above-referred to station location. Relay 2SS1 accordingly locks operated through enabled make contact 2SS1–4, enabled make contact 20NWA–6 and release break contact (LK1–4) to ground. The operation of relay 2SS1 thus provides a record in marker circuit 2 at this time of the specific special service line involved in the instant connection.

Figure 6:
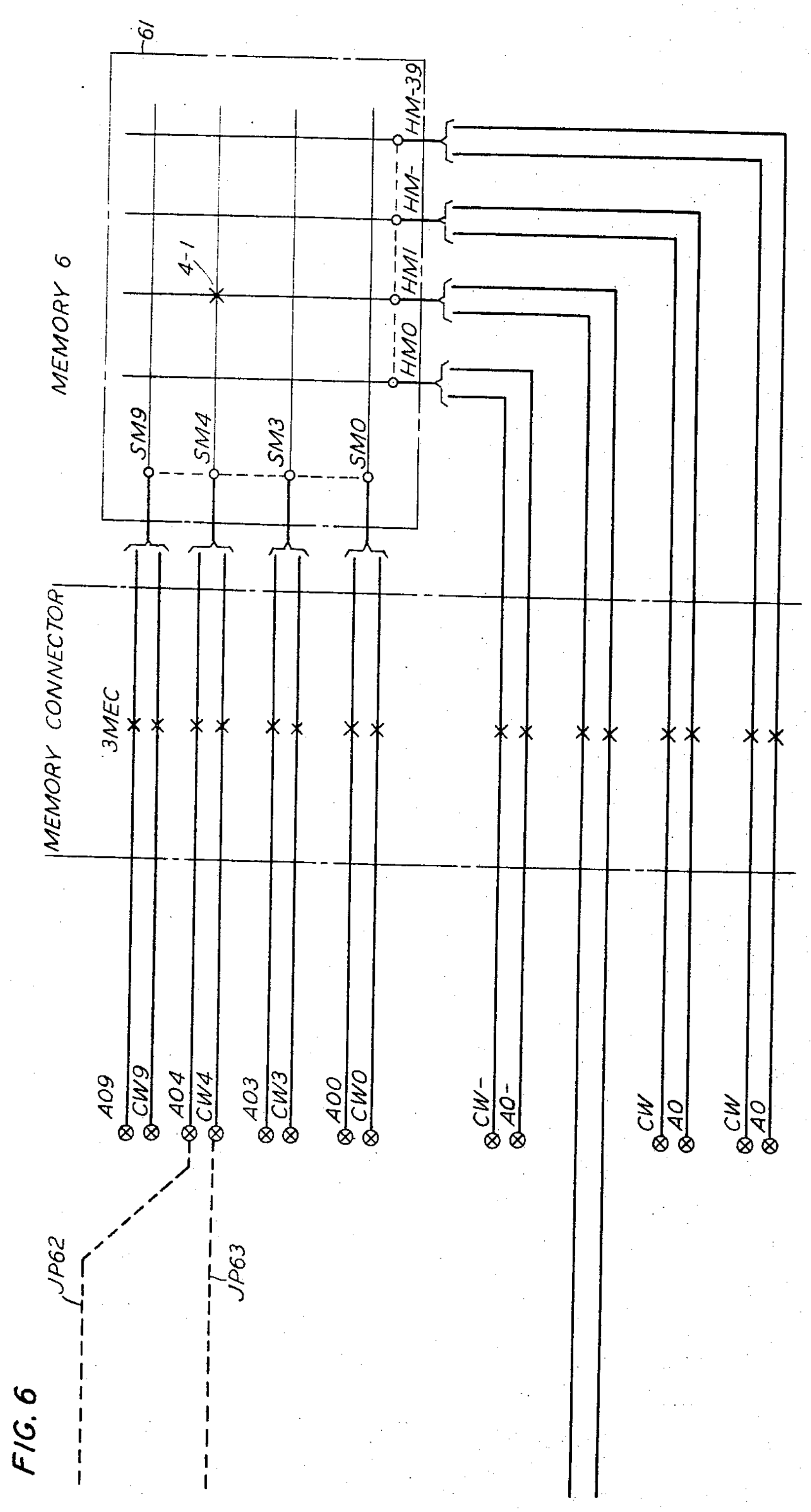

Referring momentarily to FIG. 6, it will be noted that the memory arrangement provided comprises a crossbar switch wherein each of ten horizontal units is uniquely associated with a particular switching circuit and each of forty vertical units is uniquely associated with a particular subscriber line, thus, in the instant case, crossbar switch 61 comprises means for recording the association between any one of ten switching circuits and any one of forty special service lines. As will be more apparent hereinafter, the enabling of a select magnet associated with a particular switching circuit and the subsequent enabling of a hold magnet associated with a special service line, thereby closes a crosspoint which is unique to a particular switching circuit and a particular line. As will also be more apparent hereinafter, the memory circuit arrangement is thereafter available to translate a special service station location information input to an associated switching circuit appearance location information output or in the reverse direction as demanded by the particular feature currently being described. It will be further apparent that the crossbar switching memory arrangement may be extended to include an infinitely greater number of switching circuits and/or special service lines by an obvious extension of the principles set forth herein. It will also be obvious from that which is contained hereinafter that numerous other memory and translator arrangments may be provided, either electromechanical or electronic, without deviating from the scope of the invention.

Figure 3:
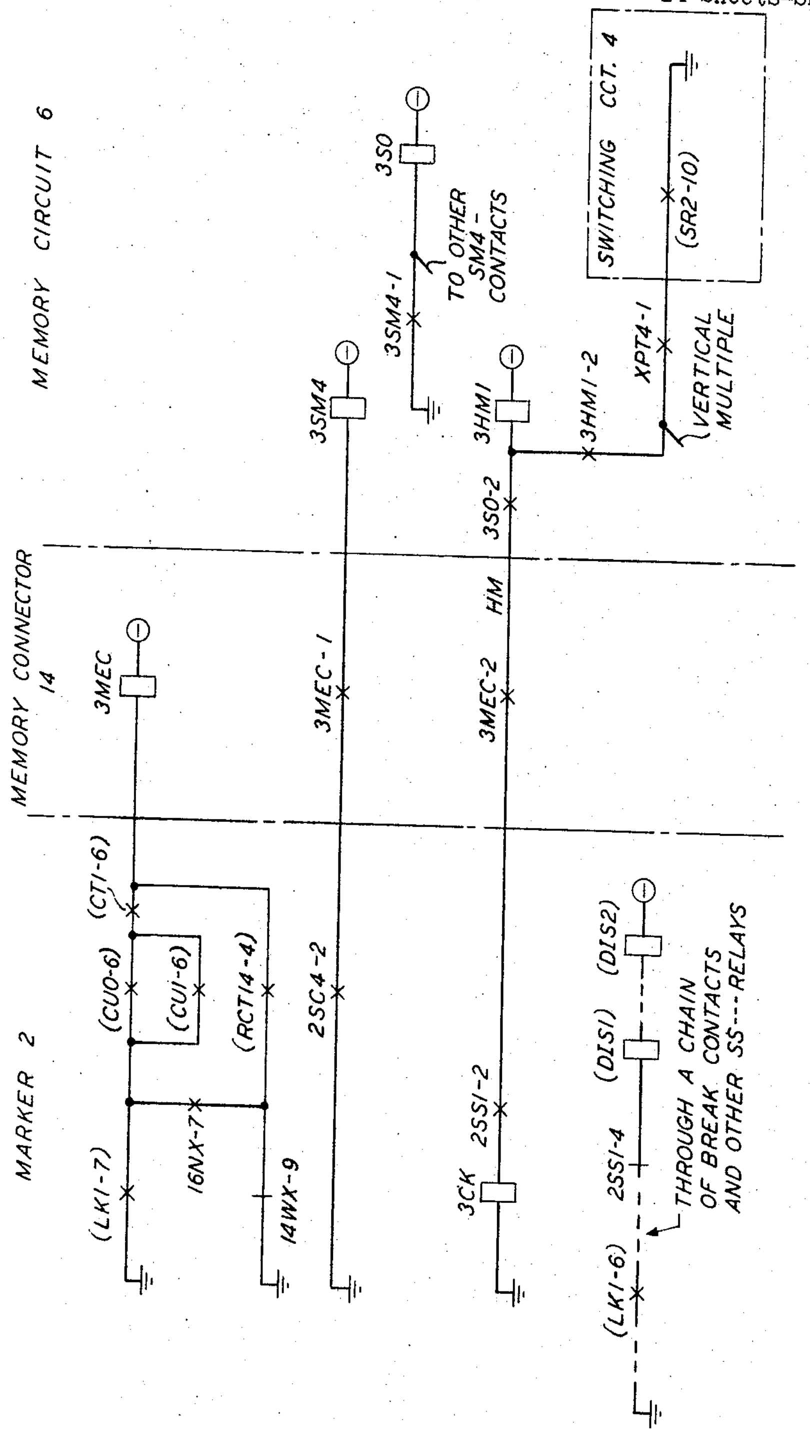

Returning now to the description, as set forth in detail in the Busch patent, the operation of particular (CU–) and (CT–) relays identify the calling line class of service. As further set forth in the Busch patent, the operation of relay (LK1) indicates the successful establishment of a linkage connection between a line link frame appearance and a trunk link frame appearance. In the instant embodiment, we shall assume that class of service 10 identifies station S1 as a privileged line. Accordingly, relay 3MEC in memory connector 14 operates at this time by a path which extends through enabled make contacts (CT1–6), CU0–6), and (LK1–7) to ground. Memory connector 14, as manifested by the 3MEC relay, is advantageously arranged identically to other connectors, such as number group connectors which are described in detail in the Busch patent and which permit a marker to select a circuit such as a number group independently of a concurrent selection by any other marker. In the instant embodiment, the operation of connector relay 3MEC extends a plurality of leads between marker circuit 2 and memory circuit 6 as shown in FIG. 3. Upon the enabling of relay 3MEC, an obvious operate path is completed to cause the operation of select magnet 3SM4 in memory circuit 6. The operation of select magnet 3SM4 closes its off-normal make contacts 3SM4–1 which completes the obvious operate path of relay 3SO at this time. Enabled make contact 3SO–2 thereupon completes an operate path for hold magnet 3HM1 which extends via the HM lead to marker circuit 2, via enabled make contact 2SS1–2, and through the 3CK relay winding to ground. Relay 3CK operates at this time in series with hold magnet 3HM1. The operation of hold magnet 3HM1 closes crosspoint 4–1 in memory circuit 6 (FIG. 6). Referring momentarily to FIG. 2, it will be noted that the enabling of break contacts 3CK–4 and 3CK–3 opens the locking paths of relays 2SC4 and 2SS1, respectively, thereby causing their release at this time.

The enabling of off-normal make contact 3HM1–2 provides a locking ground which extends through the vertical multiple of the crossbar switch, through crosspoint 4–1, to ground present on enabled make contact (SR2–10) in switching circuit 4. As set forth in detail in the aforerecited Krom application, the connection of a switching circuit through to a continuous subscriber loop such as that manifested by station S1 causes the operation of relay (SR2) in the associated switching circuit. It will thus be obvious that the crosspoint 4–1 on crossbar switch 61 in memory circuit 6 is under control of the (SR2–10) make contact in switching circuit 4. As will be more apparent hereinafter, the subsequent abandoning of a call by the calling party will result in the release of switching circuit 4 and consequently in the release of the memory crosspoint exclusively associated therewith.

The released condition of the 2SS1 relay as above set forth, extends ground so as to cause the operation of relays (DIS1) and (DIS2) in FIG. 3 at this time. Marker circuit 2 thereupon releases as set forth in detail in the A. J. Busch patent.

Figure 4:
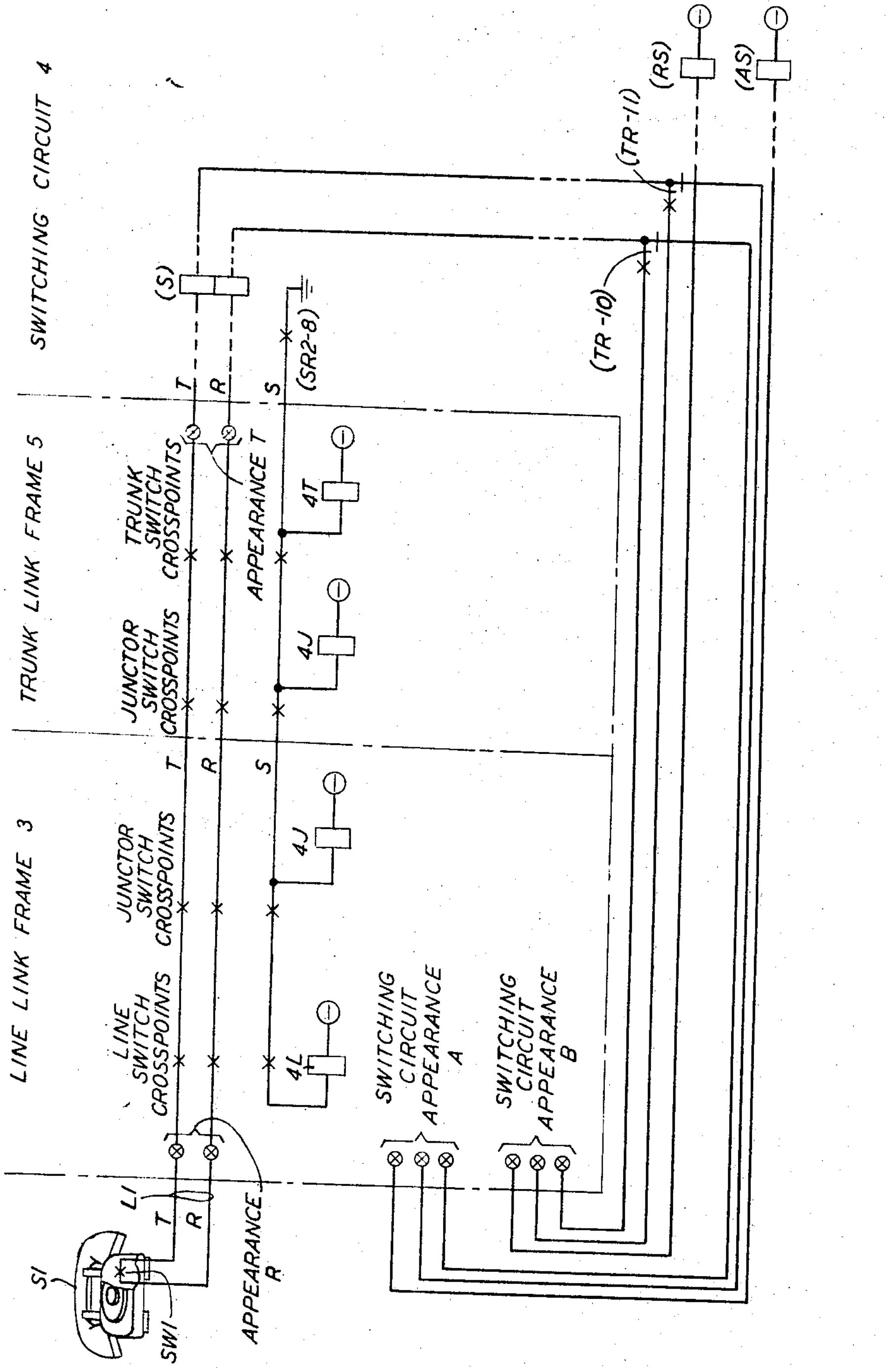

In the Busch arrangement, the existence of a continuous subscriber loop from a line link frame appearance causes a bid for a dial tone connection through the associated line link marker connector. Referring momentarily to FIG. 4, it will be noted that, by virtue of the aforesaid circuit operation, a continuous subscriber loop exists from station S1 via line L1 appearance R on line link frame 3, via the associated link and junctor crosspoints to appearance T of switching circuit 4 on trunk link frame 5, and via switching circuit 4 through to appearance A on line link frame 3. Accordingly, a marker such as marker circuit 2 receives a request for dial tone from the switching circuit 4 appearance A at this time.

The dial tone connection proceeds exactly as set forth in the Busch patent. Thus, a linkage connection is extended from appearance A on line link frame 3 through the links and junctors to an available register appearance such as appearance X of originating register 7 on trunk link frame 5 (FIG. 1). Accordingly, the marker thereupon releases, dial tone is transmitted in the well-known fashion, and we shall assume that the subscriber at station S1 dials a directory number which requires the use of an outgoing trunk such as outgoing trunk 9 shown in FIG. 1.

As set forth in detail in the Busch patent, when originating register 7 has recorded therein the called line numericals, a marker such as marker 2 is again selected and this information in conjunction with the calling line equipment appearance information is forwarded by the register to the marker.

Summarizing momentarily, marker circuit 2 thus receives the called line information transmitted by station S1 and also the line equipment location information for appearance A of switching circuit 4. It is obvious, of course, from the preceding description that no direct correspondence exists between the privileged line and the particular switching circuit used on this call. Thus, for charging purposes in connection with the call which is about to be completed by marker circuit 2, it will be necessary to ascertain the line equipment location information of station S1.

Referring now to FIG. 3, we shall assume that the class of service assigned to the appearances associated with switching circuits such as switching circuit 4 are numerically designated as class of service 11, thus, as set forth in detail in the Busch patent relays (CU1) and (CT1) are operated at this time. Accordingly, as hereinbefore described, during the course of the marker function the 3MEC memory connector relay is enabled to again cause the selection of memory circuit 6.

Figure 5:
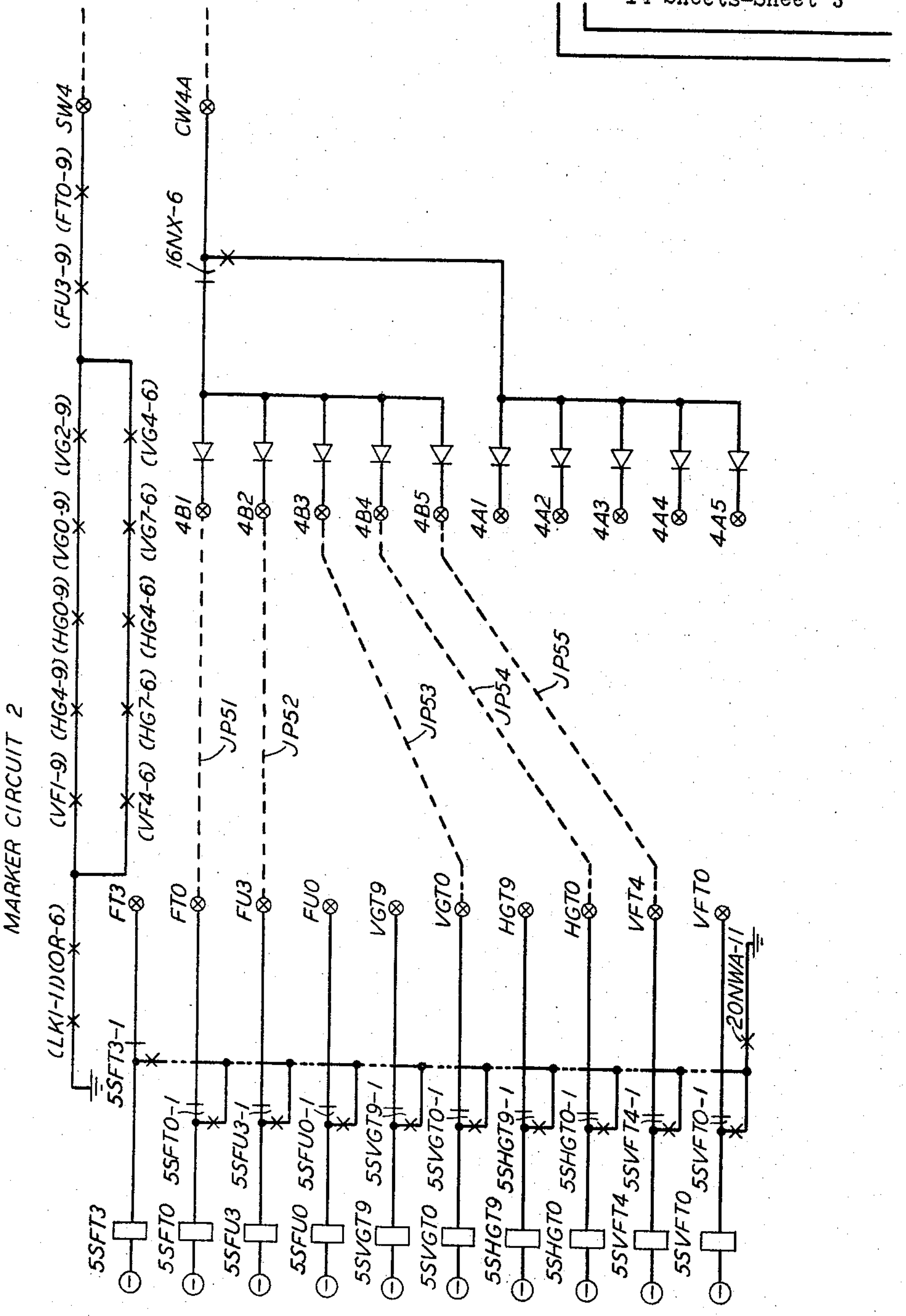
Figure 10:
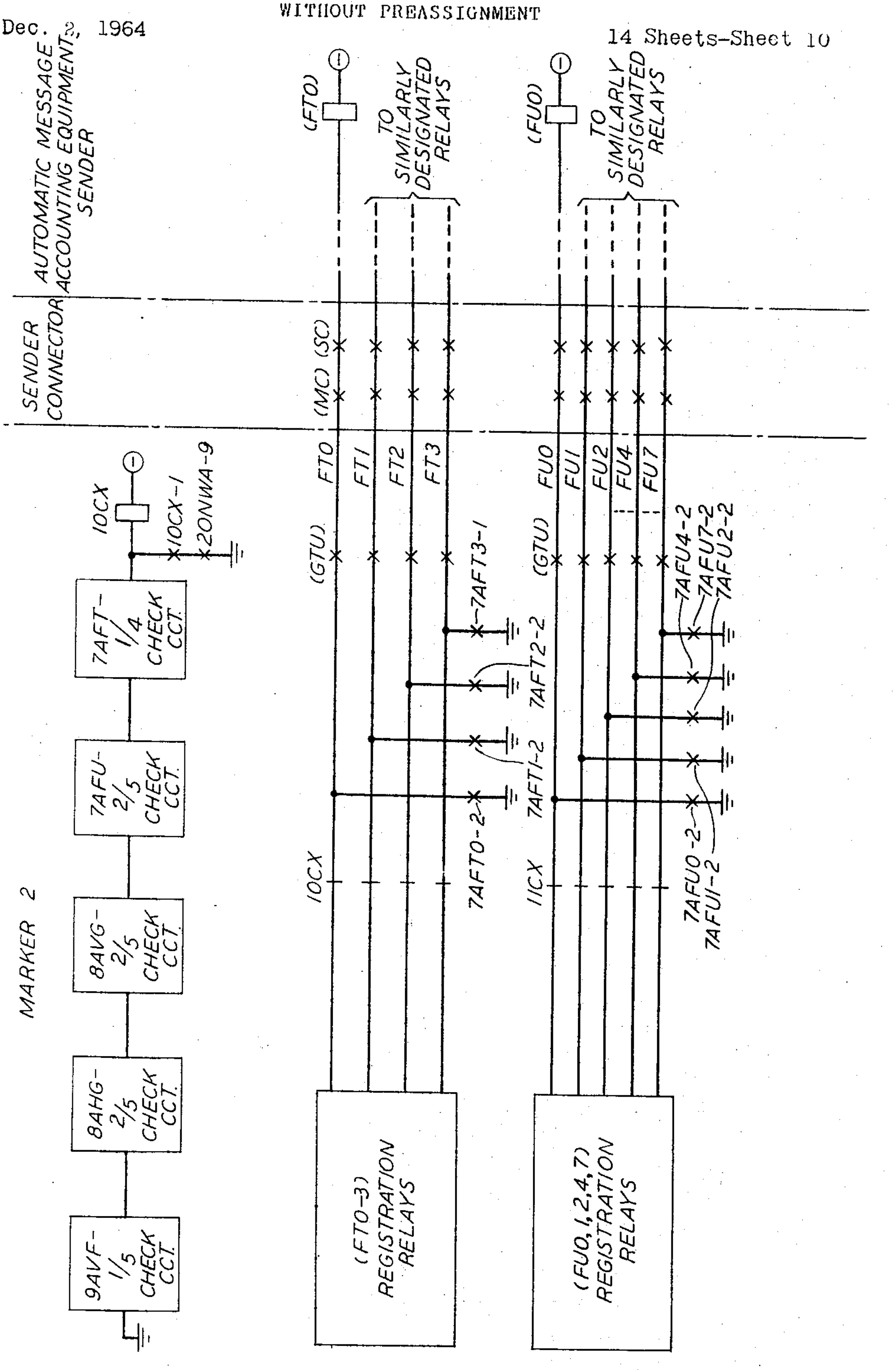

Referring now to FIG. 5, as set forth in detail in the Busch patent beginning in column 71 therein, the enabling of relay (OR) indicates that the calling line equipment location information currently registered in the marker has been received from an originating register. For purposes of explanation, we shall assume that the A appearance of switching circuit 4 on line link frame 3 is in vertical group 2, horizontal group 4, and vertical file 1. Thus, at this time a ground is extended to punching SW4 by a path which may advantageously extend through enabled make contacts (LK1–11), (OR–6), (VF1–9), (HG4–9), (HG0–9), (VG0–9), (VG2–9), (FU3–9) and (FT0–9). This ground is extended by a jumper JP62 to the AO4 punching in marker circuit 2, and then via enabled contacts on the memory connector relay 3MEC to the horizontal multiple SM4 associated with switching circuit 4 on crossbar switch 61 in memory circuit 6. This ground is further extended through enabled crosspoint 4–1 through the vertical multiple HM1 associated with special service station 1, via enabled make contacts on enabled memory connector relay 3MEC to the AO1 through AO8 punchings in marker circuit 2. From these punchings the ground is extended via jumpers JP71 through JP78 to punchings which complete obvious operate paths for auxiliary line equipment location identity relays. These relays lock operated via their respectively designated make contacts 1 to enabled make contacts 20NWA–9. As earlier stated, we have assumed, for purposes of the embodiment, that the special service line appearance R is located on line link frame 3, vertical group 2, horizontal group 4 and vertical file 4. Accordingly, relays 7AFT0, 7AFU1, 7AFU2, 8AVG0, 8AVG2, 8AHG0, 8AHG4, and 9AVF4 are operated at this time. Referring now to FIG. 10, the enabling of the aforedescribed relays which manifest the identity of the privileged station location causes the operation of relay 10CX by an operate path which extends through check circuits of a type well known in the art on each of the aforesaid relays.

As set forth in detail in the Busch patent, prior to release of the marker upon the establishment of a calling connection, the calling line equipment location information associated with the calling line is forwarded to the automatic message accounting equipment sender. In the instant arrangement, the enabling of break contacts associated with relay 10CX is employed to interrupt the continuity of these leads from their respective register circuits in the marker to the sender. Accordingly, as will be noted by an inspection of FIG. 10, the enabling of the above-referred to 7AFT0, 7AFU1, 7AFU2, 8AVG0, 8AVG2, 8AHG0, 8AHG4, and 9AVF4 relay contacts impress ground potential on the leads associated therewith, through enabled make contacts in the sender connector, to the appropriate register relays in the sender.

Summarizing briefly, at this point the transmittal by marker circuit 2 of the line equipment information associated with appearance A of switching circuit 4 has been inhibited and the line equipment location information associated with appearance R of station S1 has been substituted therefor. Accordingly, the charging equipment bills the appropriate charges to the calling station as set forth in detail in the Busch patent.

(2.03) *Add-on connection via switching circuit 4 subsidiary appearance B*

We shall assume that the subscriber at station S1 who is currently connected to a called party via switching circuit 4, appearance A, decides to exercise the add-on feature at this time. The manner in which the subscriber controls this feature by switchhook flash is set forth in detail in the Krom application and therefore will not be repeated herein. However, referring to FIG. 4, as set forth in the Krom application, upon enabling of the B appearance associated with switching circuit 4 a dial tone connection is completed to that appearance.

Station S1 thereupon proceeds to dial into the connected originating register the called line numericals of the party to be added. Upon receipt of this information, the originating register calls in the marker so as to cause completion of the connection to the called line.

Upon completing this connection as set forth in the Busch patent, it will be necessary for the marker to again identify the equipment location of station S1 for charging purposes. Referring now to FIG. 5, we shall assume that the B appearance of switching circuit 4 on line link frame 3 is in vertical group 0, horizontal group 0, and vertical file 4. Accordingly, as hereinbefore described and as shown on FIG. 5, the enabling of identification relays associated with this equipment location causes punching SW4 to be again grounded. Thus, upon the interrogation of memory 6 as hereinbefore set forth, the calling line equipment location information of station S1 is again read out of the memory and is forwarded to the automatic message accounting equipment.

Thus, for an add-on call from appearance B of switching circuit 4, the automatic message accounting equipment receives the calling line location information for station S1 so that appropriate charging may take place.

(2.04) *Incoming call to an activated station S1*

As discussed generally hereinbefore, the special service subscriber station S1 is provided with the calls-waiting feature in addition to the add-on feature. The calls-waiting feature provides means whereby a privileged subscriber may be alerted to an incoming call to his line during the period when he is connected with another party. In the instant arrangement, referring to FIG. 4 as set forth in the Krom application, an incoming call is completed to the B appearance associated with the switching circuit and a tone is impressed upon the privileged line to inform the subscriber that an incoming call awaits his attention and that a connection thereto may be completed by switchhook flash.

For purposes of explanation, we shall assume that station S1 has completed a connection through to outgoing trunk 9 via switching circuit 4 as hereinbefore described, and that station S1 is currently engaged in a conversation with a party via that trunk. As set forth in detail in the immediately preceding section, this connection extends from the appearance A of switching circuit 4 to the V appearance of the outgoing trunk. Accordingly, appearance B of switching circuit 4 is idle at this time. Assuming that the incoming call were to arrive via incoming trunk 8 as shown in FIG. 1, an incoming register would be attached to receive the called line directory number as set forth in detail in the A. J. Busch patent. As further described in detail in the Busch patent a marker, such as marker circuit 2, is thereupon seized and the calling line directory numerals are forwarded to the marker by the incoming register which thereupon releases. Since the marker is unable to complete a connection to a called line based merely upon a digital directory number, it is necessary for this directory number to be translated into physical equipment location information. As set forth in detail in the Busch patent a number group circuit, such as number group 10, is seized by marker circuit 2 to translate this directory number information into the physical equipment location of the called station in terms of line link frame number, vertical group number, horizontal group number, vertical file number and ringing combination.

Digressing momentarily, it is obvious from the foregoing that the connection of the incoming trunk to the called line equipment location indicated by the number group would not be satisfactory since the switching circuit currently associated with station S1 must be serially connected between the calling trunk and the called station. In addition as described subsequently, in the event station S1 were inactive, a switching circuit, such as switching circuit 4, should be initially inserted in the connection prior to ringing the called station.

Figure 7:
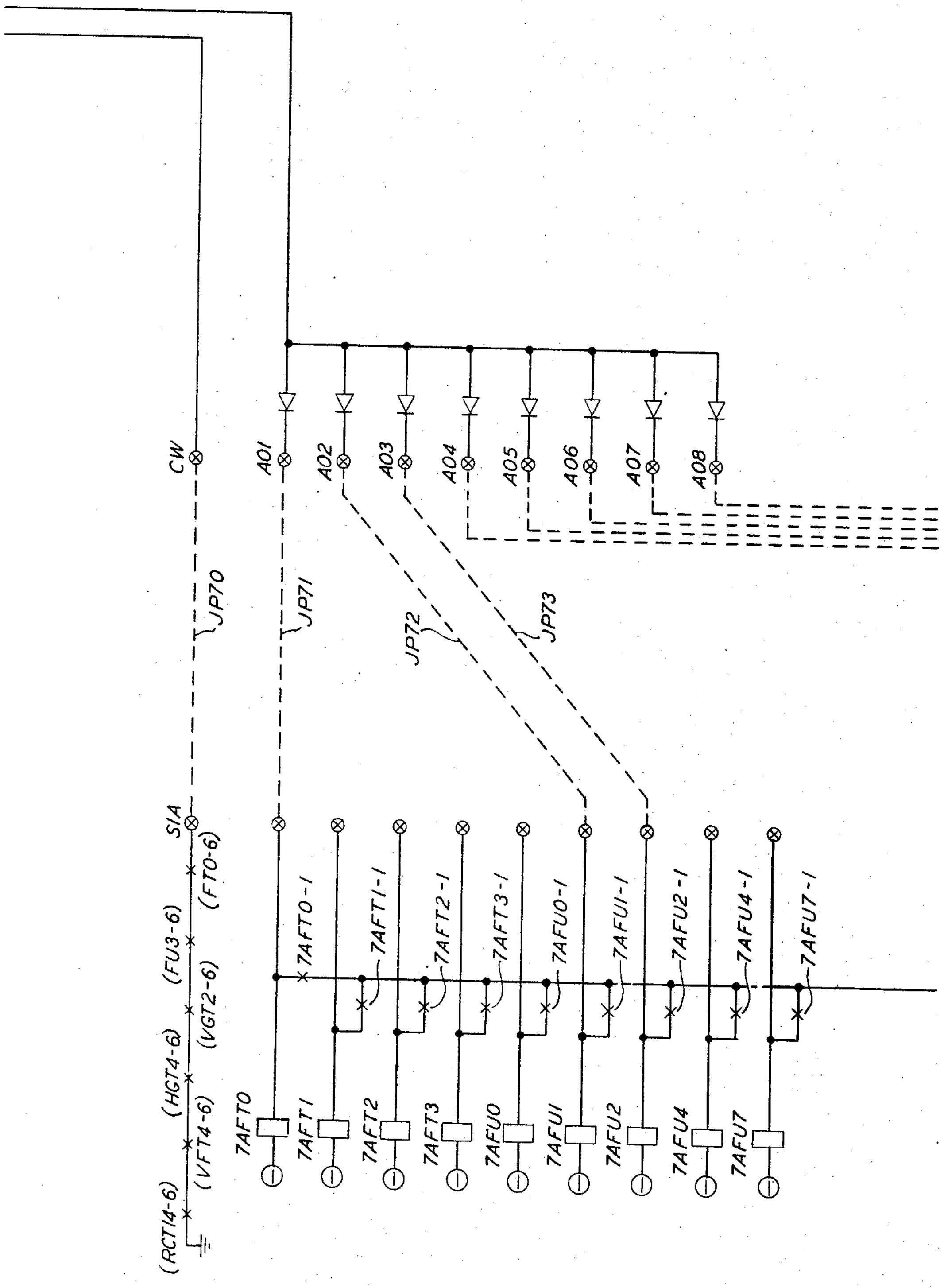
Figure 8:
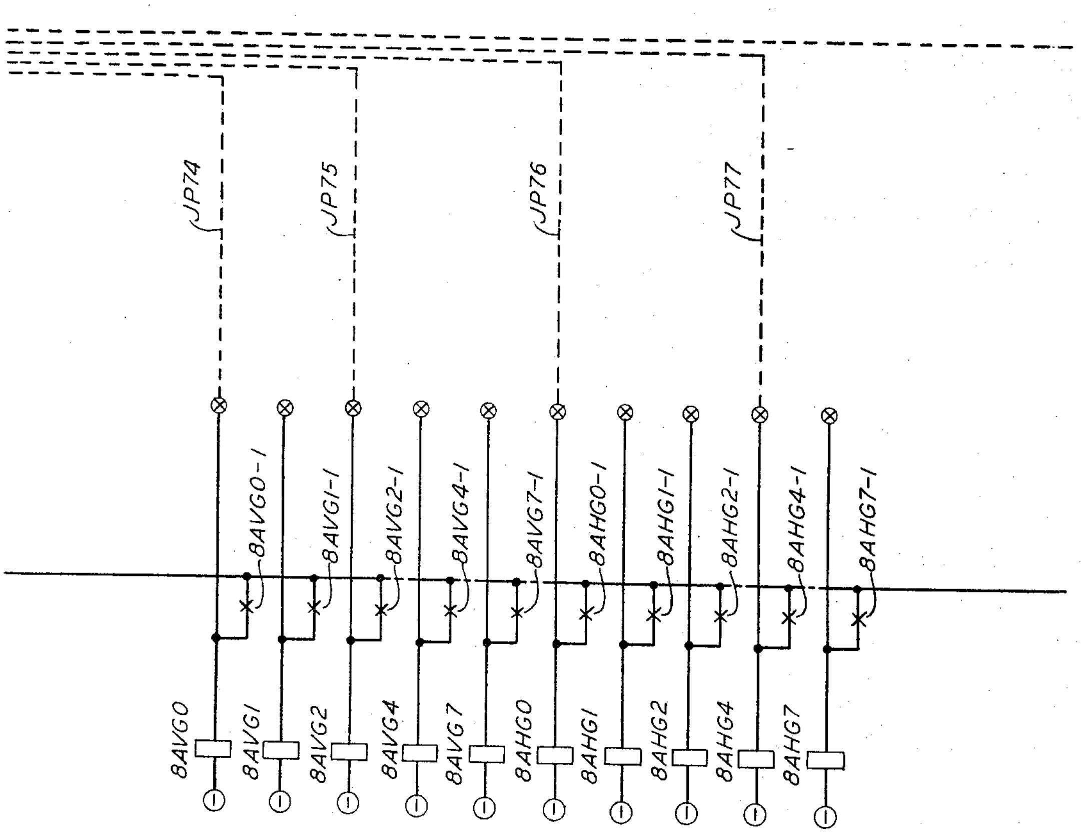
Figure 14:
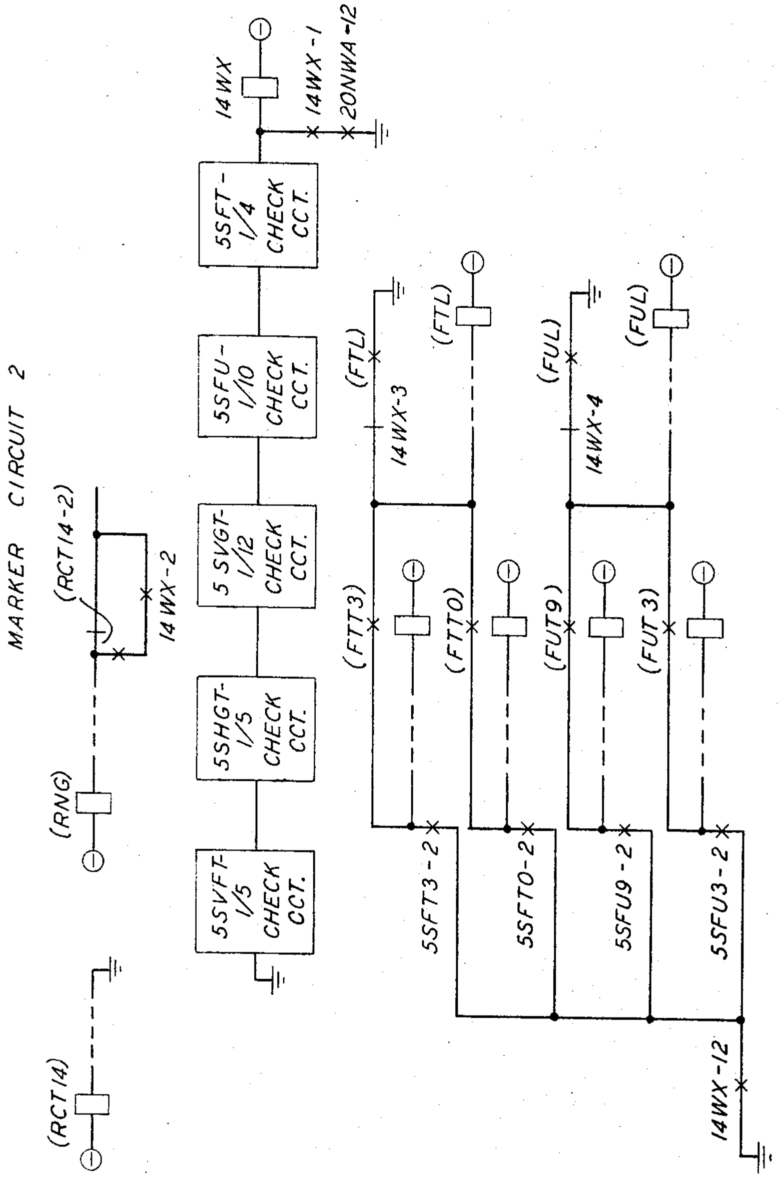
Figure 15:
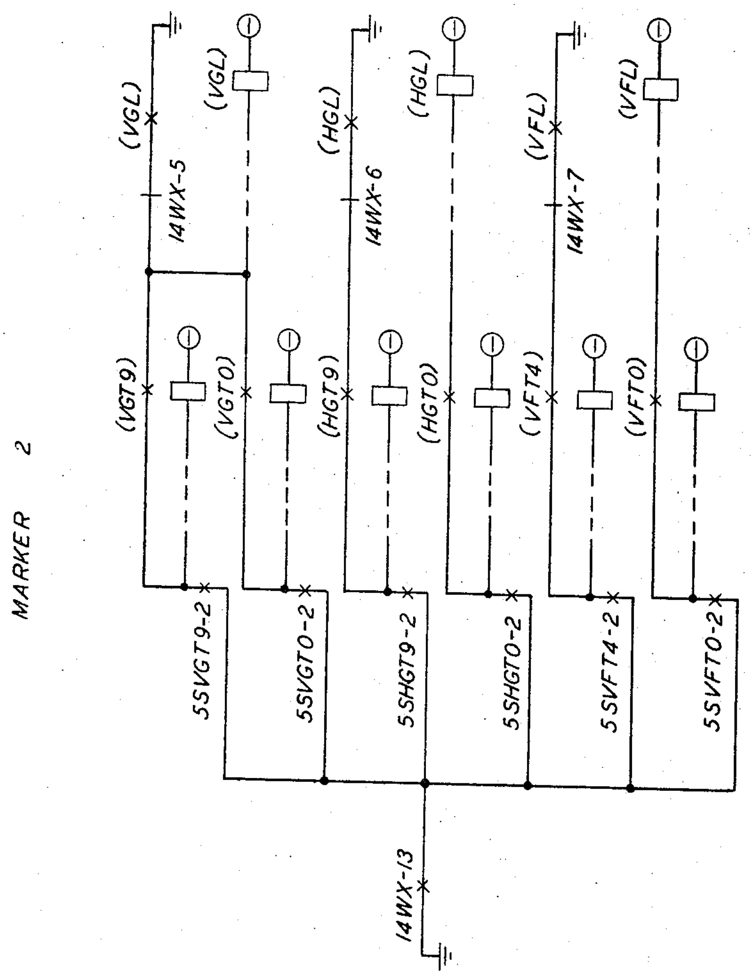
Figure 16:
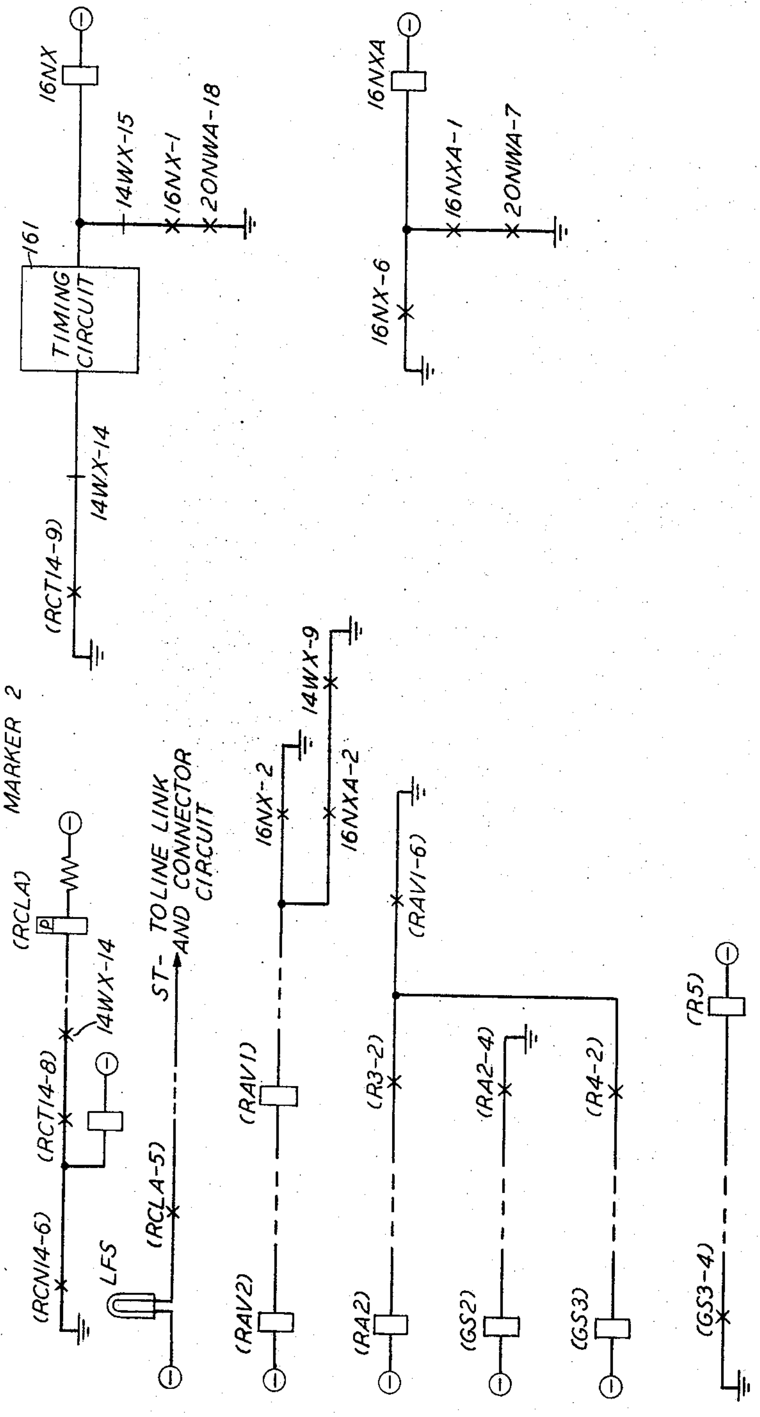

Proceeding now with the description, as discussed in detail in the Busch patent, the ringing combination assigned to the called station may be utilized to also indicate a particular status such as two-party line service or a PBX service. In the instant arrangement, ringing combination 14, as manifested by operated relay (RCT14) in FIG. 14, indicates to the marker that the called station is a special service station requiring the serial insertion of a switching circuit in the connection in the event that this has not been priorly accomplished. Referring now to FIG. 3, the enabling of make contact (RCT14–4) extends ground from released break contact 14WX–9 to operate memory connector relay 3MEC to cause seizure of memory circuit 6 as hereinbefore described. As shown in FIG. 7, enabled make contact (RCT14–6) impresses ground potential through a chain of make contacts on the line equipment location identification relays which manifest the equipment location of station S1 to a punching designated S1A and thence via jumper JP70 to the CW punching associated with vertical unit HM1 in memory circuit 6. As described in the immediately preceding section, crosspoint 4–1 is enabled at this time and thus this ground potential on lead CW is extended through the memory connector to the CW4 punching in the marker which is associated with selector level 4. This ground is further extended from punching CW4 via JP63 to the CW4A punching, through released break contact 16NX–6 to the 4B1 through 4B5 punchings which are, in turn, cross connected to punchings FT0, FU3, VGT0, HGT0 and VFT4. Accordingly, the correspondingly designated relays operate at this time and lock operated through their respective make contacts numbered 1 to positive ground present on the 20NWA–11 make contact. It may be noted as earlier set forth that the operated line equipment location relays 5SFT0, 5SFU3, 5SVGT0, 5SHGT0, and 5SVFT4 yield the equipment location of the B appearance of switching circuit 4. Referring now to FIG. 14, the operation of the aforementioned line equipment identification relays complete check circuits of a type well known in the art so as to extend ground to the operate winding of relay 14WX. Relay 14WX thus operates at this time and locks operated to positive ground present on operate make contact 20NWA–12. As set forth in detail in the Busch patent, the operated (FTT–), (FUT–), (VGT–), (HGT–), and (VFT–) relays manifest the identity of the called equipment location as received from the number group. As shown on FIGS. 14 and 15, the operation of break contacts 14WX–3, 14WX–4, 14WX–5, 14WX–6, and 14WX–7, cause the release of these currently operated line identification relays. The enabling of make contacts 14WX–12 and 14WX–13 extend ground through make contacts numbered 2 on the priorly operated relays 5SFT0, 5SFU3, 5SVGT0, 5SHGT0, and 5SVFT4, to operate the correspondingly designated line identification relays in the marker. Concurrently therewith, the priorly released (FTL), (FUL), (VGL), (HGL), and (VFL) relays are reoperated as a check of the operation of the line identification relays associated therewith.

As set forth in detail in the Busch patent, the operation of relay (RCLA) (FIG. 16) manifests a check of the successful reception of the ringing combination information from the number group. In the instant arrangement the operation of relay (RCLA) is delayed until the enabling of make contacts 14WX–14 which thereby completes the obvious relay path of relay (RCLA). The enabling of relay (RCLA) closes its make contact 5 so as to extend negative ground through the LFS resistance lamp to the start lead associated with the called line link and connector circuit as set forth in detail in the Busch patent.

Summarizing momentarily, at this point the originally received called line equipment location information has been erased from the marker registration relays and has been replaced with the line equipment location of switching circuit 4 appearance B which is currently associated with station S1, based upon information read out of memory 6 by marker circuit 2.

As set forth in detail in the A. J. Busch patent, a linkage connection is thereupon completed from appearance S of incoming trunk 8 to appearance B of switching circuit 4. The calls-waiting feature is enabled and controlled as set forth in detail in the aforesaid Krom application.

(2.05) *Incoming call to an idle station S1*

The immediately foregoing section described the circuit operation for the condition where an incoming call is completed to an activated station S1 via the B appearance of switching circuit 4. This section shall be concerned with the circuit operation which occurs when an incoming call is directed to station S1 in its idle condition. In this situation, as discussed generally hereinbefore, it will be necessary to select an idle switching circuit and to insert that switching circuit serially in the connection to the called station.

We shall assume that incoming trunk 8 is activated in the course of the incoming connection and that the call proceeds identically as hereinbefore described to the point where the marker circuit receives the number group translation. Thus, relay (RCT14) operates to indicate to the marker the privileged status of the called station. Referring to FIG. 3, as hereinbefore described, the enabling of make contact (RCT14–4) causes the seizure of memory circuit 6 via memory connector circuit 14. At this point the called special service line location information relays are operated (FIG. 7) and thus transmit a ground signal via the S1A to CW cross connection, to the memory switch vertical unit associated with station S1 as hereinbefore described. However, since we have assumed that station S1 is idle at this time, there will be no enabled crosspoints associated with this particular vertical unit and thus the ground potential will not cause a translation to occur. Concurrently with the selection of memory circuit 6 it will be seen by reference to FIG. 16 that the enabling of make contact (RCT14–9) provides a ground to enable timing circuit 161. Timing circuit 161 may comprise a number of configurations well known in the art such that in response to a constant ground input signal a predetermined time interval is measured after which a ground signal is provided as an output indication.

In the instant arrangement timing circuit 161 is arranged to extend this ground potential so as to complete the obvious operate path of relay 16NX. It will be noted that the operation of relay 14WX, which manifests the receipt of a translated output from memory circuit 6 as hereinbefore described, will cause the enabling of break contact 14WX14 to inhibit the timing circuit. However, since this translation is not forthcoming at this time, relay 16NX operates and locks operated through released break contact 14WX–15 and operated make contacts 16NX–1 and 20NWA–18 to ground.

As set forth in detail in the A. J. Busch patent beginning at column 206, line 54 therein, the marker circuit may be arranged to route advance so as to cause the completion of a connection by a route different than that at first attempted. This feature is advantageously utilized in the instant embodiment such that route advance occurs upon the aforedescribed operation of relay 16NX so as to cause the marker to serially insert a switching circuit in the calling connection. Thus, enabled make contact 16NX–2 completes the operate path of relays (RAV2) and (RAV1). As described in the Busch patent, the enabling of make contacts (RAV1–6) extends ground through the priorly operated route relay contacts so as to operate a route advance relay. In the instant arrangement we shall assume that the operate path of route advance relay (RA2) is completed via enable make contact No. 2 on route relay (R3) to ground present on the (RAV1–6) make contact. Enabled make contact (RA2–4) may advantageously be arranged to cause the operation of relay (GS2). As set forth in detail in the Busch patent, the enabling of relay (GS2) is arranged to extend ground supply leads associated with the new route. Referring now to FIG. 2, it will be noted that the enabling of make contact (GS2–4) completes the obvious operate path of route relay (R4). As described hereinbefore, route relay (R4) causes the completion of a connection from a special service line to the input of an available switching circuit. Accordingly, the connection proceeds as hereinbefore described and we shall assume that a linkage connection is established from appearance R of station S1 on line link frame 3 through to appearance T of switching circuit 4 on the trunk link frame 5. As further described in detail hereinbefore, the selection of a switching circuit causes the writing of this information in memory 6 via the enabling of crosspoints exclusively associated with the switching circuit and the special service station. Accordingly, upon completion of the aforesaid connection crosspoints 4–1 are enabled.

Referring now to FIGS. 5 through 7, it will be noted that the priorly described ground extended to the vertical unit HM1 from operated contacts on the station S1 line equipment identification relays is further extended at this time via enabled crosspoints 4–1 through the horizontal multiple SM4, to the CW4 punching in marker circuit 2, via jumper JP63 to the CW4A punching, via make contact 16NX–6 which is enabled at this time, to the 4A1 through 4A5 punchings which is cross connected to cause the operation of line identification relays associated with the switching circuit 4 appearance A in identical fashion to that hereinbefore described for the switching circuit 4 appearance B. As further described hereinbefore in detail, the enabling of the auxiliary identification relays 5SFT–, 5SFU–, 5SVT–, 5SHGT–, and 5SVFT– cause the enabling of relay 14WX. The consequent operation of break contact 14WX–15 opens the priorly described locking path of relay 16NX. Ground is thus extended through enabled make contact 14WX–9 and 16NXA–2 to operate the routed advance activation relays (RAV1) and (RAV2) so as to again cause route advance. We shall assume that relay (GS3) thus operates at this time and, in turn, causes the operation of route relay R5 which is advantageously arranged to cause completion of a conventional terminating connection. It will be noted, of course, that the line equipment location information for the A appearance of switching circuit 4 has been registered in the called line identification relay registers by the enabled condition of the aforementioned auxiliary identification relays as hereinbefore set forth.

Thus, prior to release, marker circuit 2 establishes a linkage connection from appearance S of incoming trunk 8 on trunk link frame 5 to appearance A of switching circuit 4 on line link frame 3. Ringing is applied to the called line as set forth in detail in the Busch patent, and the special service features provided by switching circuit 4 may thereafter be controlled by the special service station as set forth in detail in the aforecited Krom application. Accordingly, a subsequent add-on connection or a subsequent calls-waiting connection may be completed from and to station S1, respectively, both of which would proceed as hereinbefore described in detail.

Upon the release of the connection by station S1 or by the calling party, switching circuit 4 releases as set forth in detail in the Krom application thus releasing relay (SR2). As shown in FIG. 3, the release of make contact (SR2–10) opens the previously described locking path of hold magnet 3HM1 thus restoring the associated crosspoints 4–1 in memory circuit 6 to normal. Accordingly, switching circuit 4 is rendered available for subsequent use by other privileged stations as hereinbefore set forth.

(2.06) *Conclusion*

While the equipment of this invention has been shown in a particular embodiment wherein a privileged station is given access to a special service switching circuit having a dual network appearance, it is to be understood that such an embodiment is intended only to be illustrative of the present invention and that numerous other arrangements may be devised by those skilled in the art without departing from the spirit and scope of the invention.

For example, the invention may be used in data transmission systems wherein a privileged data transmitting device may be given access to a variable number of appearances as required for a particular connection.

Another example would be where the invention is used to provide a privileged station with an additional single nonassigned line input appearance which is provided with special equipment wherein the additional appearance is selectively inserted in the connection in response to control signals from the privileged subscriber station.

What is claimed is:

1. In an automatic switching system, a switching network comprising permanent and subsidiary input appearances each assigned a unique designation, said subsidiary input appearances being arranged as groups, means for connecting one of said permanent input appearances via said switching network to one of said groups of said subsidiary input appearances, and means for thereupon recording the association of said permanent input appearance and said group in terms of their respective designations.

2. In an automatic switching system, a switching network comprising input appearances each assigned a unique designation, each of said input appearances being arranged as permanently assigned single appearances or as groups of nonassigned subsidiary appearances, means for connecting one of said permanent input appearances via said switching network to one of said groups, and means for thereupon recording the association of said permanent input appearance and said group in terms of respective designation.

3. In an automatic switching system, a memory, a switching network comprising permanent and subsidiary input appearances and output appearances, a line connected to one of said permanent input appearances, a switching circuit connected to one of said output appearances and to a plurality of said subsidiary input appearances, control means responsive to the enabling of said line for connecting said permanent input appearance through said network to said switching circuit output appearance, and means for recording in said memory the respective identities of said permanent input appearance and said switching circuit.

4. The combination set forth in claim 3 wherein said control means further comprises means for establishing other connections between any said input appearance and any said output appearance in said network, and means responsive to the completion of any of said other connections from one of said plurality of subsidiary input appearances for interrogating said memory to read out the identity of the permanent input appearance associated therewith.

5. In a telephone system, a switching network, a plurality of special service switching circuits each having plural input appearances in said network, a plurality of special service lines each having a permanent appearance in said network, and control means responsive to a request from one of said special service lines for establishing an originating connection from the associated permanent appearance and for serially inserting a selected one of said switching circuits in said connection.

6. In a telephone system the combination set forth in claim 5 wherein said control means comprises means for establishing a terminating connection to any idle one of said special service lines and means responsive to the enabling of said terminating connection means for serially inserting a selected other one of said switching circuits in said terminating connection.

7. In a telephone system the combination set forth in claim 6 further comprising a memory, and means responsive to the enabling of said serial insertion means for recording the association of the special service line and the selected switching circuit in terms of their respective identities.

8. In a communications system, a plurality of switching circuits, a switching network comprising a plurality of input appearances and a plurality of output appearances, control means for establishing a connection between any input appearance and any output appearance, a plurality of lines each assigned a permanent input appearance in said network, and means responsive to a request from one of said lines privileged to receive special services for providing said special service line with a dual input appearance in said network comprising one of said switching circuits having an output appearance and a dual input appearance in said network, a memory comprising a plurality of address locations each individually assigned to a corresponding one of said switching circuits and means responsive to the connection of said special service line to an available switching circuit output appearance for storing in the corresponding address location the identity of the permanent input appearance assigned to said special service line.

9. In a telephone system, a memory, a plurality of registers, a switching network comprising input and output appearances, a plurality of stations including a special service station each connected to one of said input appearances, a switching circuit connected to one of said output appearances and to a plurality of said input appearances, control means operative in response to the activated state of one of said plurality of stations for connecting said station via one of said associated switching network input appearances to one of said registers, means responsive to the activation of said special service station for connecting said special service station via another one of said switching network input appearances to said switching circuit output appearance, means for connecting a predetermined one of said plurality of switching network input appearances via said network to another one of said registers, and means for storing in said memory the respective identities of said special service station input appearance and said predetermined switching circuit input appearance.

10. The combination set forth in claim 9 further comprising message accounting means, and wherein said control means further comprises means for completing a calling connection from any said network input appearance to any said network output appearance, means for registering the identity of the input appearance involved in said completed connection, means for transmitting said identity to said message accounting means, means controlled by said register means and operative in response to the registration of the identity of said predetermined switching circuit input appearance for inhibiting said transmitting means and for interrogating said memory to read out the identity of said special service station input appearance, and means for forwarding said identity to said message accounting means.

11. In a telephone system, a memory, a switching network comprising input and output appearances, a switching circuit associated with a preassigned one of said output appearances and with a preassigned plurality of said input appearances, a special service station associated with a preassigned one of said input appearances, a linkage connection extending through said network from said special service station input appearance to said switching circuit output appearance, another linkage connection from a first one of said plurality of switching circuit input appearances to a called output appearance, a preassigned address location in said memory operatively recording the association of said special service station and said switching circuit in terms of their respective identities, common control means operative in response to the reception of the identity of said special service station input appearance from a calling output appearance for interrogating said address location to read out the identity of a second one of said plurality of switching input appearances, and means for completing a linkage connection between said calling output appearance and said second circuit input appearance.

12. The combination set forth in claim 11 wherein said memory comprises means operative in response to the dis-connection of said switching circuit from said linkage connection for deactivating the said operative preassigned address location in said memory.

13. In an automatic switching system,
a switching network comprising an array of input switches and an array of output switches,
a plurality of special service lines each connected to an exclusive input switch termination,
a plurality of special service switching circuits, lesser in quantity than said special service lines, each serially connected between an exclusive output switch termination and an exclusive input switch termination,
and means responsive to the enabling of any of said special service lines for connecting said enabled line through said network to a selected switching circuit output termination, and
means controlled by said special service line for enabling said switching circuit input switch termination.

14. In an automatic switching system,
the combination set forth in claim 13 further comprising
a memory controlled by said connecting means and operative to record in association the respective designations of said enabled special service line input termination and said selected switching circuit input termination, and
means thereafter responsive to the reception of either such designation for transmitting the other said designation.

15. In a telephone switching system,
a switching network comprising a plurality of line switches and a plurality of trunk switches,
a plurality of special service lines each assigned a non-special-service line switch appearance, and
means responsive to the enabling of one of said lines for providing said line with a special service line switch appearance comprising a switching circuit having a single trunk switch appearance and at least one special service line switch appearance in said network,
a memory comprising a plurality of address locations each individually assigned to a corresponding one of said switching circuits in terms of its associated line switch appearance,
means for connecting the enabled special service line via the associated line switch appearance to an available switching circuit trunk switch appearance, and
means for storing in the corresponding switching circuit address location the identity of the single line switch appearance assigned to said enabled line.

16. In a communication switching system wherein special service lines require multiple line appearances on a switching network,
a plurality of lines each having a single appearance on said network,
a switching circuit having multiple line appearances on said network,
means for recognizing one of said lines as a special service line and for serially connecting through said network said switching circuit to said line, and
means for recording the connection of said switching circuit to said one line.

References Cited

UNITED STATES PATENTS

| | | | |
|---|---|---|---|
| 2,803,706 | 8/1957 | Althouse | 179—18 |
| 3,144,517 | 8/1964 | Albrecht | 179—18.01 |
| 3,204,043 | 8/1965 | Arseneau et al. | 179—18.01 |
| 3,231,678 | 1/1966 | Ward et al. | 179—18.01 |

WILLIAM C. COOPER, *Primary Examiner.*

KATHLEEN H. CLAFFY, *Examiner.*

L. A. WRIGHT, *Assistant Examiner.*